United States Patent
> Ryan et al.

[15] 3,658,699

[45] Apr. 25, 1972

[54] METHOD FOR REGENERATING ION EXCHANGE RESIN

[72] Inventors: Leo F. Ryan, Somerville; Dennis M. O'Brien, Chatham, both of N.J.

[73] Assignee: Ecodyne Corporation, Chicago, Ill.

[22] Filed: Oct. 24, 1969

[21] Appl. No.: 869,312

[52] U.S. Cl..............................................210/33, 210/189
[51] Int. Cl........................................................B01d 15/06
[58] Field of Search.....................................210/30–35, 189, 210/138, 139, 268, 269

[56] References Cited

UNITED STATES PATENTS

| | | | |
|---|---|---|---|
| 3,056,743 | 10/1962 | Eichhorn et al. | 210/189 X |
| 3,311,552 | 3/1967 | Staats | 210/33 |
| 3,458,440 | 7/1969 | Schmidt | 210/32 |

FOREIGN PATENTS OR APPLICATIONS

| | | | |
|---|---|---|---|
| 206,290 | 10/1956 | Australia | 210/33 |

*Primary Examiner*—Reuben Friedman
*Assistant Examiner*—Thomas G. Wyse
*Attorney*—Hume, Clement, Hume and Lee

[57] ABSTRACT

The invention provides an improved method and apparatus for upflow regeneration of ion exchange resins in a regeneration zone having a regenerant inlet and a rinse water inlet below the regenerant inlet. The carrying out the method, the introduction of regenerant and rinse water into the zone is terminated, and resin is moved downwardly within the zone while exhausted resin is introduced at the top. The introduction of regenerant and rinse water is then resumed. In accordance with the invention, the introduction of regenerant and rinse water is terminated and/or resumed at predetermined time intervals with respect to one another. The time interval is regulated to ensure that there is no substantial amount of entrained regenerant below the regenerant introduction point at the time that delivery of regenerant is resumed. The absence of entrained regenerant below the regenerant introduction point ensures that none of the resin will receive an excessive dose of regenerant when regenerant introduction is resumed.

The apparatus of the invention includes timer means for starting and stopping the flow of regenerant and rinse water at different times, and at predetermined intervals with relationship to one another.

6 Claims, 2 Drawing Figures

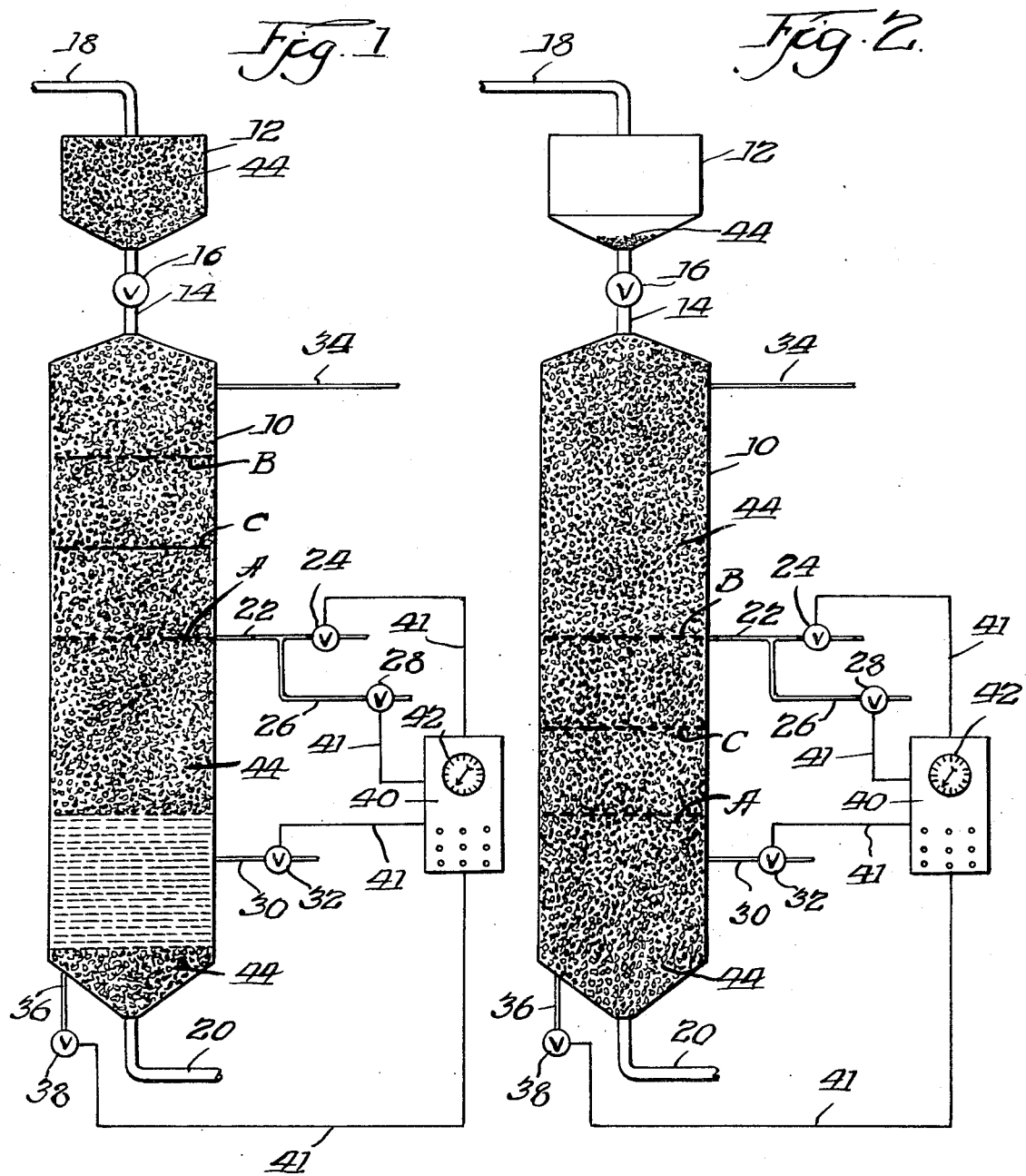

METHOD FOR REGENERATING ION EXCHANGE RESIN

The present invention relates to an improved method and apparatus for regenerating ion exchange resins, and more specifically to an improved method and apparatus that avoids the introduction of excess regenerant into portions of the resin.

In the upflow regeneration of ion exchange resins, it is conventional to introduce exhausted resins into the regeneration column at the top, while removing regenerated resins at the bottom. Each time a slug of resin is introduced, the resin contained within the column moves in a downward direction. Regenerant is generally introduced into the column near the midpoint, while rinse water is introduced into a lower portion of the column, the regenerant and rinse water being removed near the top. Thus, resin is regenerated in an upper portion of the column, and is rinsed after it moves to a lower portion of the column.

During the introduction of exhausted resin into the regeneration column, the flow of rinse water and regenerant is ordinarily stopped. When the resin moves downwardly within the column, it will carry entrained regenerant to a level below the regenerant introduction point. Since this entrained regenerant could be carried below the level of the rinse water inlet, regenerant might be carried with the resin back to the service column, where it would be introduced into the water being treated. Such a result is to be avoided, particularly in condensate water purification systems, where extreme purity is required.

Even if the entrained regenerant is not carried past the rinse water inlet by the downwardly moving resin, there is nevertheless the problem that some of the resin will receive an excessive dose of regenerant when delivery of the regenerant to the column is resumed. That is, immediately after startup, entrained regenerant will be carried upwardly by the rinse water from a level below the regenerant introduction point. At the same time, additional regenerant is introduced into the column at the regenerant introduction point. Therefore, an excessive dose of regenerant will continue until the entrained regenerant below the level of the regenerant inlet line is removed by the rinse water. Such an excessive dose of regenerant is a particular problem when cation exchange resin is regenerated with sulfuric acid, where the regenerant concentration must be carefully controlled to avoid the production of calcium sulfate precipitates.

Generally, the present invention provides a method for regenerating ion exchange resin while overcoming the aforementioned difficulties. In carrying out the method, exhausted resin is introduced in the conventional manner into an upper portion of a regeneration zone. Regenerant is introduced into the zone at a regenerant inlet point and rinse water is introduced into the zone at a rinse water inlet point below the regenerant inlet point. Periodically, the introduction of regenerant and water into the zone is terminated, and the resin is moved downwardly within the zone, while exhausted resin is introduced into an upper portion thereof. Subsequent to the introduction of exhausted resin, the introduction of rinse water into the regeneration zone is resumed. In accordance with one embodiment of the present invention, the introduction of regenerant into the regeneration zone is resumed a given period of time after resuming the introduction of rinse water. This time period must be of the proper length to permit regenerant entrained in the resin to be carried upwardly by the water entering the column a distance sufficient to reach the level of the regenerant inlet point.

In accordance with a second embodiment of the present invention, the introduction of rinse water into the regeneration zone is terminated a given period after terminating the introduction of regenerant into the column. This time period must be sufficient to permit the lower level of regenerant entrained in the resin to rise above the level of the regenerant inlet point, so that when the resin is moved downwardly within the zone, the lower level of the entrained regenerant will reach only the level of the regenerant inlet point.

It is possible to combine the foregoing embodiments, i.e., by halting the delivery of regenerant to the column before halting the delivery of rinse water below the regenerant introduction point, while later resuming the introduction of regenerant at a time interval after the introduction of rinse water is resumed. In this case, both of the time delay periods are adjusted so that the level of entrained regenerant is approximately at the level of the regenerant introduction point when the introduction of regenerant into the regeneration zone is resumed.

Finally, the present invention also provides apparatus for carrying out the method. Specifically, the invention provides improvements in a conventional ion exchange resin regeneration column of the type having upper resin input means, lower resin outlet means, regenerant inlet means, valve means on the regenerant inlet means, water inlet means below the regenerant means, and valve means on the water inlet means. In accordance with the invention, timer means are operatively connected to the valve means for stopping and starting the flow of regenerant and water at different times, and at predetermined intervals with relationship to one another.

The invention will be best understood by reference to the following detailed description, taken together with the drawings, in which:

FIG. 1 is a diagrammatic elevation view of an apparatus constructed in accordance with the present invention; and FIG. 2 is a diagrammatic elevation view of the apparatus shown in FIG. 1, but in a different stage of operation.

The regeneration column shown in the drawings is one that is particularly designed for use in a continuous countercurrent ion exchange or "CI" system. Such a system employs stationary (non-fluidized) beds of resin, which are periodically moved from the service column to a regeneration column, and optionally to a fluidized wash column, under the influence of controlled pressures. A CI system may be employed using either a mixed bed of cation and anion exchange resin, or with separate anion and cation exchange columns. In the event that a mixed bed is employed, the system must of course include a separation column for separating the cation and anion exchange resins prior to the regeneration. The basic operation of the CI system is familiar to those skilled in the art.

The drawings show a regeneration column 10 communicating with an exhausted resin hopper 12 via a resin input conduit 14 having a valve 16. Exhausted resin is delivered to the exhausted resin hopper 12 through an exhausted resin transfer conduit 18, and is removed from the regeneration column 10 through the regenerated resin conduit 20.

A regenerant inlet pipe 22 having a valve 24 communicates with a central portion of the column 10. In the most preferred embodiment, which is shown in the drawings, a dilution water inlet pipe 26 having a valve 28 communicates with the regenerant inlet pipe 22 at a point between the regeneration column 10 and the valve 24. Thus, dilution water is mixed with the concentrated regenerant just before it enters the regeneration column 10. As those skilled in the art will understand, the presence of a dilution water inlet pipe 26 is not essential, as properly diluted regenerant can simply be fed directly to the regeneration column 10 through the regenerant inlet pipe 22.

A rinse water inlet pipe 30 having a valve 32 communicates with the regeneration column 10 below the level of the regenerant inlet pipe 22. It is preferred that the rinse water inlet pipe communicates with the column a sufficient distance below the regenerant inlet pipe 22 so that when a slug of resin is introduced into the column from the exhausted resin hopper 12, unrinsed, regenerated resin will not fall past the level of the rinse water inlet pipe 30. In a CI type of ion exchange system, the rinse water inlet pipe 30 is generally referred to as a "separation water" inlet pipe, since incoming water from this pipe forms a gap or separation in the ion exchange resin, as hereinafter described.

Exhausted regenerant together with rinse water is removed from the regeneration column 10 through an upper outlet pipe 34, which is positioned above the regenerant inlet pipe 22.

Finally, the regeneration column 10 is provided with a drain pipe 36 having a valve 38, which can be opened to depressurize the column as hereinafter described.

All of the valves 24, 28, 32 are preferably automatic, and are connected to a control center 40 via electrical conduits 41. In accordance with the present invention, the control center 40 is equipped with a timer 42 for starting and stopping the flow of regenerant and rinse water to the column at different times, and at predetermined intervals with relationship to one another.

FIG. 1 shows the regeneration column 10 as it appears just before ion exchange resin is introduced from the exhausted resin hopper 12. The valves 24, 28, 32 on the regenerant inlet pipe 22, the dilution water inlet pipe 26, and the rinse or "separation" water inlet pipe 30, respectively, are all open. The valves 38, 16, located respectively on the drain pipe 36 and the resin input conduit 14 are closed. Water from the rinse water inlet pipe 30 is delivered into the regeneration column 10 under pressure. This rinse water forms a separation or gap in the resin 44, this gap containing water only. Therefore, as shown in FIG. 1 the majority of the resin 44 is compacted into an upper portion of the regeneration column 10 while a minority of the resin 44 is in a lower portion of the column. The resin below the level of the rinse water inlet pipe 30 has been forced by water pressure through the regenerated resin conduit 20, the flow of resin stopping when a predetermined amount fills a metering hopper (not shown) communicating with the other end of the regenerated resin conduit 20.

The majority of the resin in the regeneration column 10 is compacted into a portion above the level of the rinse water inlet pipe 30 by the pressure of the upwardly flowing rinse water.

Regenerant flows into the column 10 through the regenerant inlet pipe 22. This regenerant is diluted by dilution water passing through the dilution water inlet pipe 26 before it enters the ion exchange column 10. Because of the upward flow in the regeneration column 10, regenerant will normally be present within the resin 44 only above the level of the regenerant inlet pipe 22, as indicated by dotted line A.

In order to introduce exhausted resin 44 into the column 10 from the exhausted resin hopper 12, in conventional operation all of the open valves 24, 28, 32 are closed, stopping the flow of regenerant and rinse water to the regeneration column 10. At the same time, the valve 38 on the drain pipe 36 is opened, depressurizing the column 10. The loss of pressure within the column 10 causes the resin 44 to move downwardly, closing the gap that has been produced by the separation or rinse water. The valve 16 on the resin input conduit 14 will preferably be a one-way check valve that permits downward flow only. When the column is depressurized, this valve 16 opens, permitting resin 44 to flow into the column 10 from the exhausted resin hopper 12.

At the end of the introduction of exhausted resin 44 into the column 10, the column will be completely filled with resin as shown in FIG. 2, while the exhausted resin hopper 12 is nearly empty. At the same time that this step is being performed, the metering hopper (not shown), previously referred to as communicating with the other end of the regenerated resin conduit 20, is also emptied, so that it may receive a new charge of regenerated resin when the regeneration column 10 is repressurized.

As shown in FIG. 2, in conventional operation the lowest level of resin containing regenerant has moved downwardly within the regeneration column 10 to a level below the level of the regenerant inlet pipe 22, as indicated by displacement of the dotted line A from FIG. 1 to FIG. 2. It can therefore be seen that if the delivery of regenerant and rinse water to the regeneration column were resumed at this time, the resin above the level of the regenerant inlet pipe 22 would receive an excessive dose of regenerant. That is, this resin would receive regenerant from the regenerant inlet pipe 22, and would also be treated by the regenerant carried upwardly with the rinse water from the rinse water inlet pipe 32.

In accordance with one embodiment of the present invention, after the depressurization step has been completed, the valve 38 on the drain pipe 36 is closed, and the valve 32 on the rinse water inlet pipe 30 is opened. At the same time, in the most preferred embodiment, the valve 28 on the dilution water inlet pipe 26 is also opened. The introduction of water from the rinse water inlet pipe 30 repressurizes the column, and re-establishes the separation in the resin shown in FIG. 1. Resin from below the level of the rinse water inlet pipe 30, which will have regenerated and rinsed, is forced downwardly out of the column through the regenerated resin conduit 20 until the metering hopper (not shown) has been filled. At the same time, water flowing upwardly to the upper outlet pipe 34 compacts the majority of the resin into the column at a level above the rinse water inlet pipe 30.

Because the regeneration column 10 is pressurized at this time, it is preferred to deliver water through the dilution water inlet pipe 26 simply to avoid clogging of the regenerant inlet by resin 44.

The upwardly moving rinse water within the regeneration column 10 will cause the bottom level of entrained regenerant to rise within the resin 44 until it reaches the level of the regenerant inlet pipe 22. This rise will require a predetermined time interval. Therefore, the timer 44 is set to open the valve 24 on the regenerant inlet pipe 22 after the level of entrained regenerant rises to the regenerant inlet point. Thus, the delivery of an excessive dose of regenerant to any portion of the resin 44 is avoided.

During the regeneration step, resin is delivered to the exhausted resin hopper 12 through the exhausted resin transfer conduit 18, so that the exhausted resin hopper 12 will be filled as shown in FIG. 1.

In accordance with a second embodiment of the present invention, the flow of regenerant to the regeneration column 10 is halted prior to the above-described depressurization step. This is accomplished by setting the timer 42 to close the valve 24 on the regenerant inlet pipe 22 a predetermined time interval before the end of the regeneration cycle. As shown in FIG. 1, this closing of the valve 24 on the regenerant inlet pipe 22 allows the bottom level of entrained regenerant within the regeneration column 10 to rise to a level indicated by dotted line B. This distance between dotted line B and the regenerant inlet pipe 22 should be about equal to the downward distance through which the entrained regenerant will travel during the depressurization step. Thus, as shown in FIG. 2, subsequent to depressurization, dotted line B will have dropped to approximately the level of the regenerant inlet pipe 22. When the delivery of regenerant to the regeneration column 10 is resumed, there is no entrained regenerant below the level of the regenerant inlet pipe 22, and therefore none of the resin 44 receives an excessive dose.

As is obvious from the foregoing description, both embodiments may be combined while nevertheless achieving the desired result. For example, the delivery of regenerant may be halted for a lesser time period prior to regeneration so that the level of entrained regenerant is permitted to rise only to, say, dotted line C in FIG. 1. After depressurization, the level of entrained regenerant will have dropped below the level of the regenerant inlet pipe 22 as shown in FIG. 2. However, by delaying the introduction of resin for a suitable time period as determined by the timer 42 the level of entrained regenerant can be permitted to rise to the level of the regenerant inlet pipe 22 before resumption of the delivery of the regenerant.

It will also be apparent to those skilled in the art that the applicability of the present invention is not limited to a "CI" system as described in the preferred embodiment. Rather, the method is equally applicable to any regeneration system employing a regeneration zone having a regenerant inlet pipe and a rinse water inlet pipe below the regenerant inlet pipe.

The method of the present invention is applicable to both anion and cation exchange resins. In an anion exchange resin regeneration column, the regenerant will normally be sodium hydroxide, while in a cation exchange resin regeneration column, the regenerant will usually be a strong acid such as sulfuric or hydrochloric acid. The present invention has particular application, however, where sulfuric acid is employed to regenerate cation exchange resins. In this instance, the control of the regenerant concentration within the regeneration column 10 is critical in order to avoid the formation of precipitates such as calcium sulfate.

The regeneration method and apparatus of the present invention are adaptable to use with a wide variety of anion and cation exchange resins. Typical solid cation exchange resins that may be employed in the present invention are those of the divinylbenzene-styrene copolymer type, the acrylic type, the sulfonated coal type, and the phenolic type. Typical solid anion exchange resins that may be employed in the present invention are the phenol-formaldehyde type, the divinylbenzene-styrene copolymer type, the acrylic type, and the epoxy type. The anion and cation resins are both preferably employed as beads in the size range of about 16–60 mesh. Suitable bead resins are sold under the trade names Amberlite, manufactured and sold by Rohm & Haas Company, and Nalco resins sold by Nalco Chemical Company. Particularly suitable ion exchange resins are sold under the trade names Amberlite IRA–900 and IRA–400 (anionic); and IRA–200 and IRA–120 (cationic).

Obviously many modifications and variations of the invention as hereinbefore set forth will occur to those skilled in the art, and it is intended to cover in the appended claims all such modifications and variations as fall within the true spirit and scope of the invention.

We claim:

1. A method for regenerating ion exchange resin comprising: the sequential steps of introducing exhausted ion exchange resin into an upper portion of a regeneration zone; introducing a regenerant into said zone at a regenerant inlet point; introducing rinse water into said zone simultaneously with said regenerant introduction at a water inlet point below said regenerant inlet point; periodically terminating said introduction of said regenerant and said rinse water into said zone; moving said resin downwardly within said zone and introducing exhausted resin into an upper portion thereof while said introduction of said regenerant and said rinse water is terminated; resuming the introduction of rinse water into said regeneration zone; and resuming the introduction of regenerant into said zone a given time period after resuming said introduction of rinse water, said time period being sufficient to permit regenerant entrained in said resin to be carried upwardly by said water a distance sufficient to reach the level of said regenerant inlet point.

2. The method as defined in claim 1 wherein said introduction of said regenerant and said rinse water are terminated at the same time.

3. The method as defined in claim 1 wherein said introduction of rinse water is terminated a given time period after terminating introduction of said regenerant, said given time period being sufficient to permit the lower level of regenerant entrained in said resin to move downwardly past said regenerant inlet when said resin is moved downwardly in said regeneration zone.

4. The method as defined in claim 1 wherein said resin is cation exchange resin and said regenerant is sulfuric acid.

5. A method for regenerating ion exchange resin comprising: the sequential steps of introducing exhausted ion exchange resin into an upper portion of a regeneration zone; introducing a regenerant into said zone at a regenerant inlet point; introducing rinse water into said zone simultaneously with said regenerant introduction at a water inlet point below said regenerant inlet point; periodically terminating said introduction of said regenerant into said zone; terminating said introduction of rinse water into said zone a given time period after terminating introduction of said regenerant; moving said resin downwardly within said zone and introducing exhausted resin into an upper portion thereof while said introduction of said regenerant and said rinse water is terminated; and resuming the introduction of regenerant and water into said zone, said given time period being sufficient to prevent entrained regenerant from being carried downwardly by said resin past the level of said regenerant inlet point.

6. The method as defined in claim 5 wherein said resin is cation exchange resin and said regenerant is sulfuric acid.

* * * * *